UNITED STATES PATENT OFFICE.

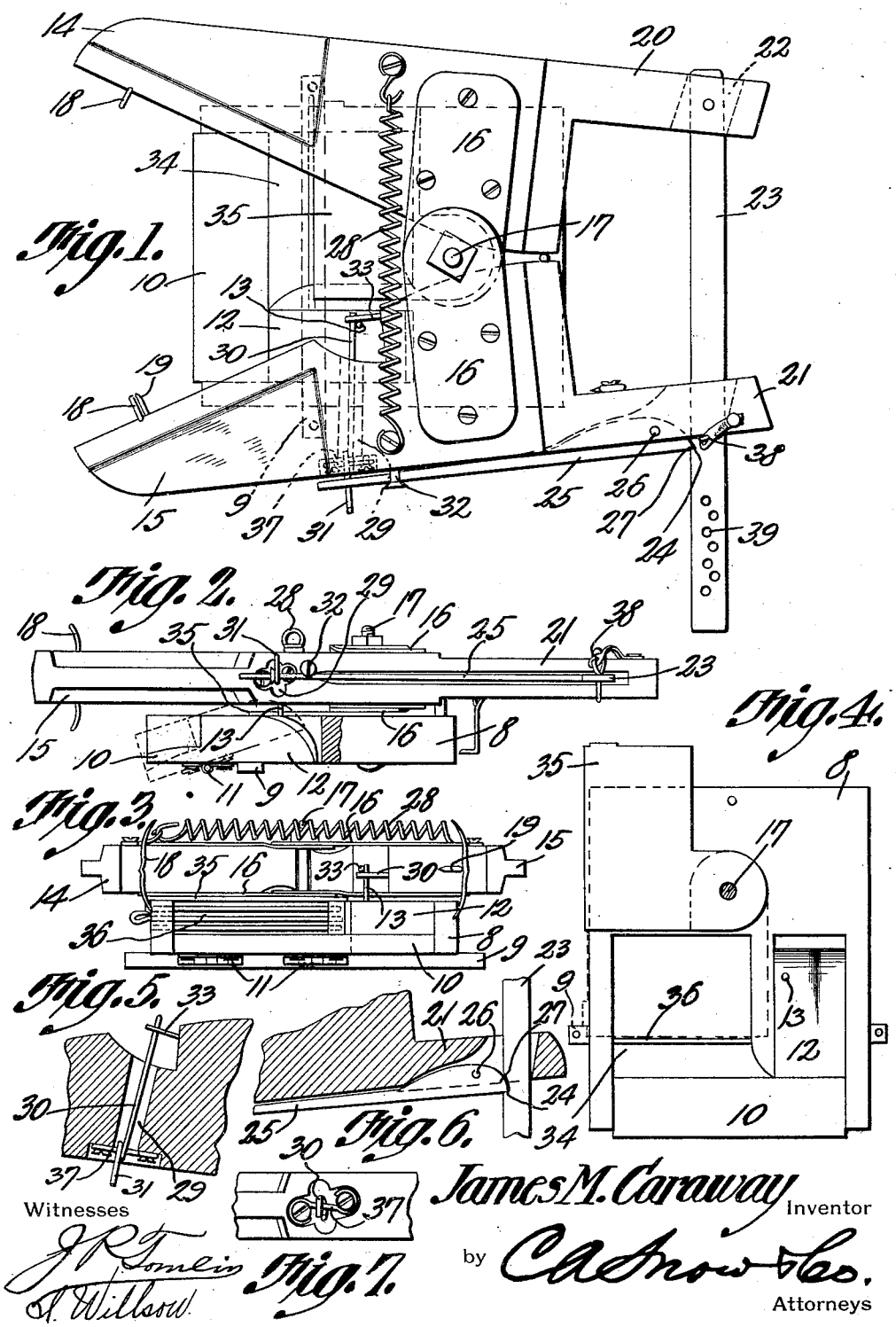

JAMES M. CARAWAY, OF LONGMONT, COLORADO.

TRAP.

1,120,904.  Specification of Letters Patent.  Patented Dec. 15, 1914.

Application filed August 11, 1913. Serial No. 784,287.

*To all whom it may concern:*

Be it known that I, JAMES M. CARAWAY, a citizen of the United States, residing at Longmont, in the county of Boulder and State of Colorado, have invented a new and useful Trap, of which the following is a specification.

This invention relates to a new and useful form of animal trap.

An object of the present invention is to provide a trap which will be easy to set in operative position and which will be released by the weight of the animal as it steps upon a suitable treadle.

A further object is to provide an animal trap with a small cage secured thereto whereby live bait such as prairie-dogs, fowl, and so forth may be used.

A further object is to provide two horizontally movable jaws between which the animal will be attracted by suitable bait and in attempting to reach the bait which is placed between and slightly beneath the jaws will automatically release the jaw holding mechanism which will immediately spring to a closed position and by means of suitable rods or prongs, capture and kill the wild animal.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a plan view of my improved form of trap. Fig. 2 is a side view thereof, a portion of the base being removed and illustrating the treadle which in turn releases the trigger, the latter holding the jaws in an open position. Fig. 3 is a front view with the jaws open or extended. Fig. 4 is a plan view of the base, the jaws and mechanism connected thereto being removed. Fig. 5 is a fragmental view in cross section of one of the jaws and depicting the trigger releasing mechanism. Fig. 6 is a similar view of the same jaw, showing the trigger in a locked position. Fig. 7 is a view in elevation of the trigger releasing mechanism shown in Fig. 5.

Referring to the drawings in which similar reference numerals designate corresponding parts throughout the several views, a base 8 is provided with a beam 9 extending transversely thereof and which beam 9 serves as anchoring means whereby the entire trap may be rigidly secured to the ground. The beam 9 also slightly raises the forward portion of the base so that the treadle 10 can be raised a suitable distance above the ground so that it may swing freely upon its hinge supports 11.

The treadle 10 upon which the animal steps for the releasing of the trap is L-shaped in outline the one portion thereof extending between the sides of the base which is cut away for the accommodation thereof. The rearwardly extending portion 12 of the treadle is provided with an upstanding rod 13 which is moved upwardly and forwardly as the front portion of the treadle is pressed downwardly by the weight of the animal thereon.

The jaws 14 and 15 are provided with the plates 16 which overlap and through which extends a pivot bolt 17. This pivot bolt 17 is located centrally of the sides of the base 8 and adjacent the rear extremity thereof. The forward ends of the jaws 14 and 15 are provided with what are termed the body irons 18 which are intended to extend around and grip the animal as the jaws move upon the same. The number of irons and their character will depend entirely upon the species of animals which are to be caught. Also attention is called to the particular prong 19 clearly illustrated in Fig. 3 which is intended to pierce the animal and to instantly kill the same. The rear extremities of the jaws 14 and 15 are elongated as at 20 and 21 respectively to which is secured the mechanism whereby the jaws are set and retained in an open position; the releasing from said position being accomplished by the lowering of the forward portion of the treadle as will be hereinafter more fully explained.

The rear extension 20 of the jaw 14 is provided with an opening 22 extending transversely therethrough and in which is pivotally secured what is termed the jaw holding bar 23. The bar 23 is provided with a notch 24 which is positioned at a point such that it will extend a slight distance beyond the outer extremity of the rear extension 21 of the jaw 15 through which the jaw holding bar 23 passes when the jaws 14 and 15 are in an open or extended position substantially as illustrated in Fig. 1 of the drawings.

Extending longitudinally of the jaw 15 is a trigger 25 pivotally secured thereto as at 26 and with the lower sharpened end 27 thereof adapted to engage the notch 24 of the jaw holding bar 23. A tensional spring 28 is rigidly secured to the jaws 14 and 15 adjacent the front end thereof so that when the trigger is released from the notch 24 the jaws 14 and 15 will be brought forcibly together. With the trigger in a set position as illustrated in Fig. 1, there will be a constant tendency for the extensions 20 and 21 to move apart with the result that the upper portion of the trigger 25 will tend to move outwardly away from the jaw 15 which will release the jaw holding bar 23 and allow the jaws to come together. As illustrated in Fig. 5, there is an opening 29 extending transversely through the jaw 15 and through which opening extends a trigger holding member 30. As illustrated in Fig. 2, the trigger holding member is provided with the upwardly and outwardly extending arm 31 which is adapted to engage the trigger 25 and hold the same beneath a suitable support illustrated as a screw 32. The inwardly extending portion of the trigger holding member 30 when in a set position extends under a horizontal holding rod 33. When positioned beneath said holding rod 33 the trigger 25 is held tightly against the side of the jaw 15 and head of the screw 32 thus preventing the outward movement of the trigger and preventing the release of the jaw holding bar 23. As illustrated in Fig. 1, the upstanding rod 13 of the treadle extends behind the trigger holding member 30 so that when the treadle 10 is moved downwardly, the upstanding rod 13 is moved upwardly and forwardly and moves the inner portion of the trigger holding member 30 from beneath the horizontal supporting arm 33 with the consequent releasing of the arm 31 and allowing the trigger 25 to move outwardly and the lower portions of the jaws to swing apart, the latter action being accomplished by the spring 28. A portion of the base is cut away as at 34 and a suitable cover 35 positioned thereover and which cover may be removed, it being pivoted about the bolt 17 as illustrated in Fig. 4. The front portion of the opening 34 is partially closed by means of the bars 36 whereby a receptacle or compartment is formed wherein live bait may be placed and at the same time be visible from a considerable distance, to entice the animal within the range of action of the jaws. When it is desired that the live bait in the form of fowl, prairie dogs, or other small animals be placed within the compartment, the bars 36 may be removed, or cover 35 may be swung about its pivot 17, either of which renders the compartment accessible. As illustrated in Fig. 7, the trigger holding member 30 is wrapped about and pivotally secured to a cross bar 37 which allows the member 30 to move in a horizontal as well as a vertical direction, it being pointed out that the connections between the bar 37 and member 30 allows for considerable play therebetween.

In order to facilitate the setting of the trap and the baiting thereof means in the form of a latch 38 are provided which engage suitable openings 39 which are adapted to hold the jaws 14 and 15 in an extended position and allow for a setting of trap, this being rather an important feature when the trap is made of considerable size as it is thought will be readily appreciated.

Having thus fully described my invention, what I claim is:—

1. In an animal trap, the combination of a base with the forward portion thereof removed, a treadle rotatably secured within the removed portion of said base, jaws pivotally secured to the said base and provided with extensions projecting rearwardly therefrom, a jaw holding rod pivotally secured to one of the said extensions and projecting to the opposite extension, a trigger pivotally secured to the last mentioned extension and adapted to engage the said jaw holding rod, and means for holding the trigger in a set position, said means adapted to be released by a moving of the said treadle.

2. In an animal trap, the combination of a base, a treadle pivotally secured to the front portion of the base and provided with a rearwardly extending portion, jaws mounted above and moving in a plane parallel to the said base and pivotally secured thereto, resilient means secured to the said jaws adapted to bring the same forcibly together, said jaws provided with rearwardly extending projections, a jaw holding member pivotally secured to one of the said projections and extending through the opposite projection, a trigger secured to the last mentioned projection and adapted to engage the jaw holding member, said holding member adapted to hold the jaws in spaced relation with the trigger in a set position, a trigger holding member secured to one of said jaws and adapted to hold the said trigger in a set condition, and an upright arm secured to the said treadle and adapted to release the said trigger holding member with the downward movement of said treadle, the releasing of said trigger holding member releasing said trigger and jaw holding member.

3. An animal trap comprising a base, a treadle carried thereby, a movable jaw pivotally secured to said base and provided with an extension projecting rearwardly therefrom, a jaw holding rod slidably engaging the said extension, resilient means engaging said movable jaw adapted to move the same to a closed position, a trigger pivotally secured to and carried by said jaw extension, engaging said jaw holding rod and preventing the movement of said jaw, and means engaging said treadle for a releasement of the trigger by a movement of said treadle.

4. An animal trap comprising a base, a treadle movably carried thereby, jaws pivotally secured to the base moving above said treadle, said jaws provided with rearwardly projecting extensions, a jaw holding rod pivotally secured to one of said extensions and slidably engaging the opposite extension, a trigger pivotally secured to and carried by the last mentioned extension engaging the said jaw holding rod, means for holding said trigger in a set position, said means adapted to be released by a movement of said treadle.

5. In an animal trap, the combination of a base provided with the forward portion thereof removed, a treadle pivotally secured within the removed portion, said base provided adjacent one edge thereof with a compartment for the reception of live bait therein, means for rendering the said compartment accessible, jaws pivotally secured to and mounted above the said base, said jaws moving in a plane parallel thereto, resilient means adapted to forcibly move the said jaws together, means secured to the contacting faces of the said jaws adapted to engage an animal therebetween, said jaws provided with rearwardly extending projections, a jaw member pivotally secured to one of the said projections and passing through the opposite projection, a trigger secured to the last mentioned projection and adapted to engage the said jaw holding member, the trigger holding member engaging the upper extremity of the said trigger and adapted to hold the same in a set position, said trigger holding member including an arm extending through the said jaw, a horizontally extending supporting arm adapted to receive the trigger holding member thereunder, to thereby hold the said trigger holding member and trigger in a set position, and an upstanding rod rigidly secured to the said treadle, moved by the said treadle and adapted to release the said trigger holding member from beneath the said horizontally extending member, the trigger, and the jaw holding member allowing for the moving of said jaws together.

In testimony that I claim the foregoing as my own, I have hereto affixed my signature in the presence of two witnesses.

JAMES M. CARAWAY.

Witnesses:
B. H. BUEHLER,
D. G. HUYETT.